US010693944B1

(12) United States Patent
Rane

(10) Patent No.: US 10,693,944 B1
(45) Date of Patent: Jun. 23, 2020

(54) MEDIA-PLAYER INITIALIZATION OPTIMIZATION

(71) Applicant: Amazon Technologies, Inc., Seattle, WA (US)

(72) Inventor: Amit Kamlakar Rane, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 240 days.

(21) Appl. No.: 15/701,707

(22) Filed: Sep. 12, 2017

(51) Int. Cl.
H04L 29/08 (2006.01)
G06F 3/16 (2006.01)

(52) U.S. Cl.
CPC .............. H04L 67/06 (2013.01); G06F 3/16 (2013.01)

(58) Field of Classification Search
CPC ... H04L 67/06; H04L 41/509; H04L 41/5054; G06F 3/16; H04N 21/47
USPC ........................................................ 709/219
See application file for complete search history.

(56) References Cited

U.S. PATENT DOCUMENTS

2004/0268400 A1* 12/2004 Barde ................ H04N 7/17318
725/94
2009/0046545 A1* 2/2009 Blinnikka ............ G11B 27/105
369/30.06
2012/0141095 A1* 6/2012 Schwesinger ........ H04N 21/431
386/290
2013/0163953 A1* 6/2013 Peacock ................ G06F 9/5016
386/231
2016/0080444 A1* 3/2016 Freeman, II ............ H04L 67/10
709/219
2016/0091606 A1* 3/2016 Shin ....................... G01S 15/025
367/112
2018/0337843 A1* 11/2018 Alsina ................. H04L 43/0864

FOREIGN PATENT DOCUMENTS

WO WO-2017033198 A2 * 3/2017 ............. H04N 21/23

OTHER PUBLICATIONS

Android Developers, "MediaPlayer—Android SDK", Android 4.2 r1, Jun. 2013, all pages, https://stuff.mit.edu/afs/sipb/project/android/docs/reference/android/media/MediaPlayer.html (Year: 2013).*

* cited by examiner

Primary Examiner — Thomas J Dailey
Assistant Examiner — Lam H Duong
(74) Attorney, Agent, or Firm — Lee & Hayes, P.C.

(57) ABSTRACT

This disclosure describes, in part, client-side techniques for reducing latency time experienced in requesting playback of media content using media players. In some examples, the techniques described herein include executing or calling one more functions to create and maintain a group, or "pool," of media player instances which are in a prepared (i.e., ready) state. In this way, rather than beginning the process of instantiating a media player instance upon receiving a playback request or command for media content, the media player instance of the media content for which playback is requested is already in the prepared state and able to transition into a playing state more quickly, which reduces latency time.

20 Claims, 8 Drawing Sheets

MEDIA-PLAYER INITIALIZATION OPTIMIZATION

BACKGROUND

Various techniques have been developed to improve the functioning of media players. For instance, techniques for reducing latency time between commands to play media content by a media player and outputting the content by the media player have been introduced, such as prefetching media content to temporary storage in a device in readiness for later use. However, these techniques may be resource intensive, such as by requiring additional bandwidth, processing capabilities, and/or storage capabilities. Certain types of computing devices, such as mobile devices, may operate under resource constraints, such as constraints on processing power, storage, power consumption, and/or bandwidth. Accordingly, various types of constrained computing devices may be unable to perform resource intensive techniques for reducing latency time for playback of media content by media players.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
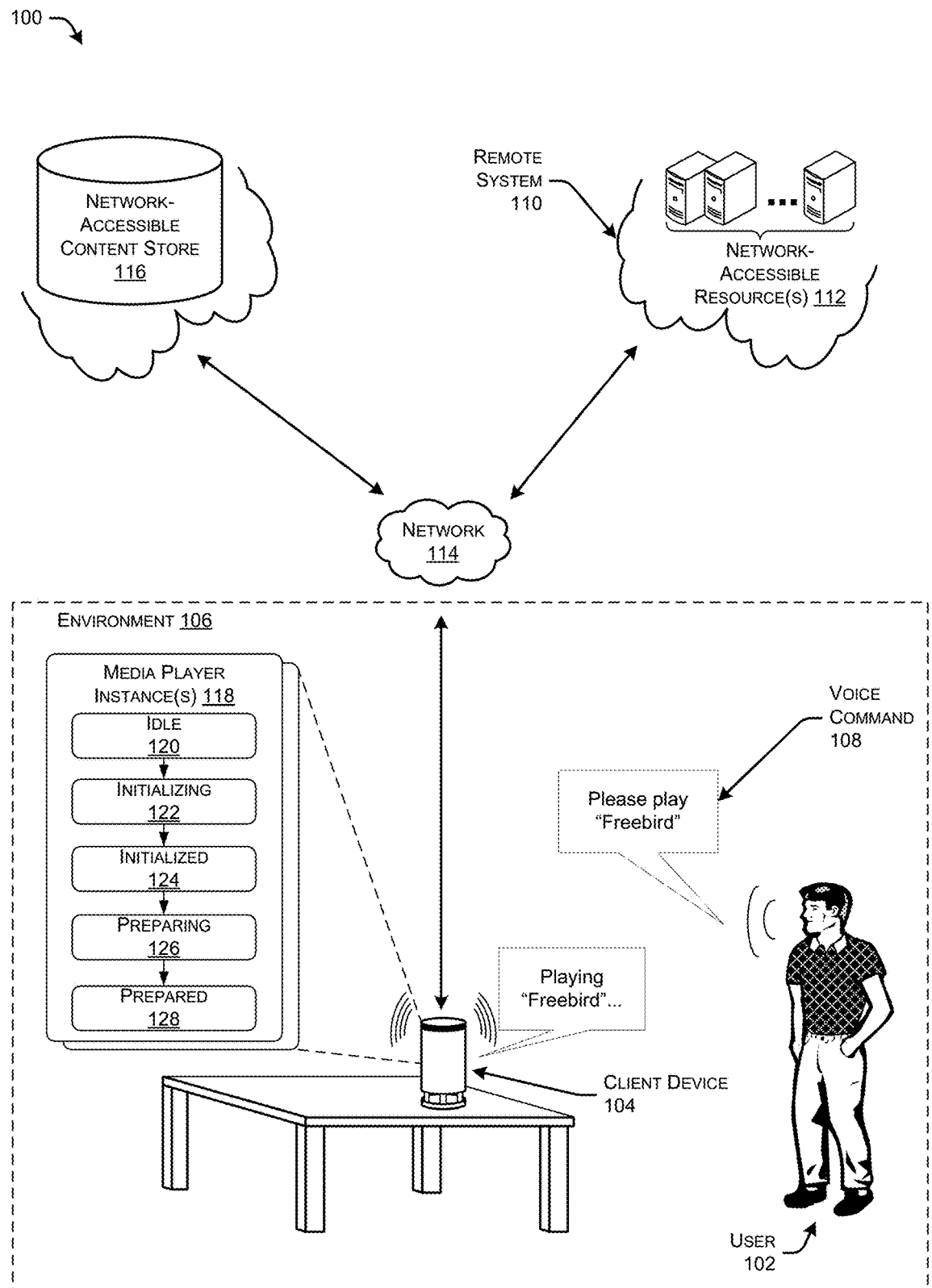
FIG. 1 illustrates a schematic diagram of an illustrative system architecture in which a client device instantiates and prepares multiple instances of a media player prior to receiving a command to play content associated with one of the instances, and causes one of the prepared instances of the media player to play content upon receiving a play command.

As noted above, various techniques have been developed to improve the functioning of media players on computing devices. These techniques include prefetching, which reduces latency time between receiving input indicating a playback request of media content and outputting the media content (e.g., audio content, video content, image content, etc.). For instance, a media player may perform perfecting by obtaining media content and placing the media content in temporary storage in the computing device in readiness for later use. However, certain types of devices, such as mobile devices, may operate under resource constraints such as constraints on processing power, storage, power consumption, and/or bandwidth. Accordingly, these resource constrained devices may be unable to perform certain types of latency reduction techniques. On these resource constrained devices, media players often use techniques for outputting media that may conserve resources, but result in unacceptable latency times for playback of media content. For instance, media players may execute media content using "lazy-loading" or "on-demand execution" where media player instances of media content are instantiated and prepared responsive to a playback request. The process of preparing a media player instance for content may result in this additional latency time, despite reducing resource requirements that techniques such as prefetching impose on the device.

This disclosure describes, at least in part, client-side techniques for reducing latency time experienced in requesting playback using various media players. In some examples, the techniques described herein include executing or calling one more functions to create and maintain a group, or "pool," of media player instances which are in a prepared (i.e., ready) state. In this way, rather than beginning the process of instantiating a media player instance upon receiving a playback request for media content, the media player instance of the media content for which playback is requested is in the prepared state and able to transition into a playing state more quickly, which reduces latency time.

In some examples, one or more components of a client device may be configured to determine (e.g., predict, identify, etc.) the media content for the pool of media player instances. In some examples, the components of the client device may determine the media content for the pool of media player instances based on media content (e.g., media file, media data, etc.) currently being output. For instance, if the media player on the client device is streaming music from an online media content source (e.g., Amazon Prime Music, Pandora Music, YouTube, etc.), the components of the client device may identify other media content indicated by the online media content source as being related, relevant, or otherwise associated with the media content being streamed and output. For instance, the online media content source may have a list of recommended artists, songs, genres, etc., associated with the media content being output.

Further, the media content source may have playlists, or other groupings of media content, which is related or associated with the media content being output. In this way, various online media content sources may provide indications of media content to be included in the pool of media content sources.

In other examples, the components of the client device may identify media content to be included in the pool of media content sources based on user patterns or history. For instance, the components of the client device analyze a history of user behavior to determine that media content being output on a client device is followed by another media content item at more than a threshold rate (e.g., 10% of the time, 20% of the time, etc.). In such examples, the components of the client device may instantiate a media player instance corresponding to the other media content item in anticipation the user will select the content item next. Once the components of the client device determine the media content to be included in the pool of media player instances, the components may further identify various addresses (e.g., identifiers, links, etc.) for the content, such as Universal Resource Locators (URLs) (e.g., streamlining) indicating network-based addressed at which the media content is stored, local physical addresses at the client device at which the media content is stored, Uniform Resource Identifiers (URIs) indicating a string of characters to identify a resource, etc.

Using the identifiers or addresses of the media content to be included in the pool of media player instances, the components of the client device may instantiate the pool of media player instances. In some examples, the components of the client device may execute one or more scripts to call various functions to cause the media player instances to be instantiated. The various functions called may be dependent on the media player and/or another software platform being used.

In some examples, the components of the client device may call or execute an open function which causes a media player instance (i.e., object) to be created (e.g., opened, generated, etc.). The newly opened media player instance may be opened into an "idle" state. The components may then call or execute an initialization function which transfers the media player instance from the idle state to an "initialized" state. Further, the components may call or execute one or more preparing functions which transfer the media player instance from the initialized state into the "prepared" state. The components of the client device may call or execute these functions for a media player instance to be prepared for each media content item identified to create the pool of prepared media player instances. The components may then maintain the pool of prepared media player instances.

Generally, once a media player instance is in the prepared state, the media player instance transitions directly into a "playing" or started state upon receiving a request or directive to being playback of the media content of the media player instance. Traditionally, media players would receive a playback request perform all of the steps from opening a media player instance, initializing the media player instance, and preparing the media player instance before the media player instance is able to transition into the playing state. However, by performing all of these steps responsive to a playback request, an unacceptable latency time may be experienced, which reduces user satisfaction. Accordingly, once a playback request for a media content item is received, the components of the client device may cause a corresponding prepared media instance to transition from the prepared state into the playing state.

In various examples, the pool of prepared media device instances may be optimized and/or limited. For example, a limit or threshold number of prepared media player instances in the pool may be determined. In some examples, the threshold number of prepared media player instances may be a static number (e.g., 1, 5, 10, 15, 50, etc.) that is pre-configured with the media player. In other examples, the components of the client device may dynamically determine the threshold number of prepared media player instances in the pool based on various factors. For example, the components may analyze user behavior to determine the threshold number of prepared media player instances in the pool. If a particular user requests playback for a significant number of different media content items (e.g., 100, 500, 1,000, etc.) in a particular period of time (e.g., a week, a month, etc.), the components may increase or dynamically set a higher threshold number of prepared media player instances for the pool (e.g., 5, 10, 15, 20, etc.) for that particular user, and vice-versa. As another example, certain content items, or content items from certain online media sources, may be used to determine the threshold number of prepared media player instances in the pool. As an example, if an online media source has a small number of recommended media content items for a media content item currently being streamed, the components of the client device may define the threshold number of prepared media player instances in the pool as being roughly the same size (e.g., 2, 5, etc.).

In this way, components of a client device are able to perform client side techniques which reduce latency time for playback of media content by a media player. While the techniques described above are described as being performed entirely by client-side components, in some examples, some or all of the techniques may be performed by a network-based service. For example, the client devices described herein may be configured to communicate with a user via voice commands, or be "voice-enabled" devices. Often voice-enabled devices may have relatively low functionality. For instance, voice-enabled devices may comprise battery powered devices which are configured to merely serve as an interface or "middle man" between a remote server, or system, and a user. In this way, the more intensive processing involved performing natural language processing to communicate with a user may be performed using large amounts of resources of remote processing services, which may extend battery life performance of voice-enabled devices. For example, a remote service may provide various services for the voice-enabled devise, such as speech processing techniques on behalf of the voice-enabled devices, content determination, command determination, etc.

Thus, in some examples, some of the techniques described herein may be performed by a speech processing system (e.g., "cloud-based service," "software as a service (SaaS)," "network accessible platform," etc.) which receives audio signal data from the voice-enabled devices. Each of the voice-enabled devices may access the speech processing system through a communications network, such as the internet, to provide the speech processing system with the captured audio signals. In various examples, the voice-enabled devices may receive a "wake" trigger (e.g., wake word, button input, etc.) which indicates to the voice-enabled devices that a user is speaking a command, and the voice-enabled devices begin streaming the audio signal data representing the spoken command to the network-based speech service.

While some of the examples described herein may be described with respect to certain software (e.g., Android OS) and/or hardwired configurations, the techniques may be applied to any media player or any platform implementation. The techniques may be applied to video playbacks, audio playbacks, streaming modes, as well as local playback modes. Further, the media content may comprise any type of content, such as digital rights management (DRM) content, non-DRM content, unencrypted content, encrypted content, and other type of content. Further, the techniques described herein may be combined with various data prefetching and/or buffering techniques to achieve further latency reduction.

In some examples, one or more of the above-noted processes may be performed in parallel to reduce latency time. For example, multiple media player instances may be instantiated in parallel for a media player on a client device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Example Architecture

FIG. 1 illustrates a schematic diagram of an illustrative system architecture 100 in which a user 102 utilizes a client device 104 to output audio in an environment 106. The client device 104 may instantiate and prepare multiple instances of a media player prior to receiving a voice command 108 to play content associated with one of the instances, and causes one of the prepared instances of the media player to play content upon receiving a play command.

As shown, the client device 104 may comprise a voice-enabled device which detected the voice command 108. For instance, the user 102 may issue a voice command 108 that requests the client device to "please play 'Freebird.'" The client device 104 may interact with a remote system 110, discussed below, to cause determine what the user 102 is requesting the client device 104 to do.

In some examples, the client device 104 may have one or more microphones that are used to capture user speech, such the voice command 108, and one or more speakers that are used to play speech (e.g., dialogue) and content. In some embodiments, the client device 104 may be designed to operate from a fixed location, and in other embodiments, the client device 104 may be portable or mobile. For instance, the client device 104 may comprise a handheld device or other mobile device, such as a smartphones tablet computer, media player, personal computer, wearable device, various types of accessory, and so forth.

As shown in the environment 106, the user 102 is interacting with the client device 104 through a voice command 108. For example, the client device 104 may receive voice commands from the user 102 via the voice command 108, and provide services in response to the commands. In some examples, the client device 104 may detect a predefined trigger expression or word (e.g., "awake"), which may be followed by instructions or directives (e.g., "please play a song," "please start a movie," etc.). Services provided by the client device 104 in conjunction with the remote processing system 110 may include performing actions or activities, rendering media, streaming media, obtaining, and/or providing information, providing information via generated or synthesized speech via the client device 104, initiating Internet-based services on behalf of the user 102, and so forth.

The client device 104 may receive or capture sound corresponding to the voice command 108 of the user via one or more microphones. In certain implementations, the voice command 108 may include or be preceded by a wakeword or other trigger expression or event that is spoken by the user 102 to indicate that subsequent user speech is intended to be received and acted upon by the voice-enabled devices 108 and/or remote system 110. The voice-enabled devices 108 may detect the wakeword and begin streaming audio signals to the remote system 110. In some instances, the client device 104 may operate in a low-functionality mode and analyze sound using ASR processing. When the wakeword is detected using ASR, the client device 104 may begin streaming the audio signal, and other data, to the remote system 110. The wakeword may be a reserved keyword that is detected locally by the client device 104, such as by using an expression detector that analyzed audio signals produced by the microphones of the client device 104 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In the example illustrated in environment 106, the user 102 issues a voice command 108 subsequent to a wakeword (or another manual input, such as a button, at the client device 104), which the client device 104 detects or captures. The client device 104 may generate an audio signal representing the voice command 108, and send the audio signal to the remote system 110, which may comprise one or more network-accessible resources 112, over one or more networks 114.

The networks 114 may represent an array or wired networks, wireless networks (e.g., WiFi), or combinations thereof. The networks 114 may include any viable communication technology, such as wired and/or wireless modalities and/or technologies. Networks 114 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The remote system 112 may generally refer to a network-accessible platform—or "cloud-based service"—implemented as a computing infrastructure of processors, storage, software, data access, and so forth that is maintained and accessible via the network 114, such as the Internet. Cloud-based services may not require end-user knowledge of the physical location and configuration of the system that delivers the services. Common expressions associated with cloud-based services, such as the remote system 110, include "on-demand computing", "software as a service (SaaS)", "platform computing", "network accessible platform", and so forth.

The network-accessible resources 112 may comprise servers, or arrangement of computing devices. Multiple such resources 112 may be included in the system 110 for performing speech recognition on the audio signals, such as an automatic speech recognition (ASR) component and a natural language understanding component (NLU). As noted above, Upon the device 104 identifying the user 102 speaking the predefined wake word (in some instances), the device 104 may begin uploading audio data—the audio data representing sound captured by a microphone(s) of the device 104 within the environment 106—up to the remote system 110 over the network 114. In response to receiving this audio data, a speech-recognition system (part of the remote system 110) may begin performing ASR on the audio data to generate text data. The NLU component 126 may then use NLU to identify one or more user voice commands from the generated text data.

Accordingly, upon receiving the audio data from the client device 104, the speech-recognition system of the remote system 110 may perform ASR on the audio data to generate text data. The text data may then be processed by the NLU component to identify a domain(s) and an intent(s). In some instances, the text data generated from the audio data will indicate multiple intents and multiple corresponding domains. In the illustrated example, the speech-recognition system performs ASR on the audio signal received from the device 104 to generate the text: "please play 'Freebird.'" The NLU component then determines, from analyzing this text, that the voice command 108 corresponds to a "music" domain and that the intent of the command 108 is about playing the song "Freebird" by Lynyrd Skynyrd, which may comprise a named entity in the command 108.

As such, components of the speech platform of the resources 112 associated with the music domain, described in further detail below, may determine media content that is to be output by the client device 104 in response to the voice command 108. For instance, the remote system 110 may determine that the intent of the voice command 108 is to play the song "Freebird," and may provide a network location at which to allow the device 104 or other device to acquire the media content. In some examples, the network accessible resources 112 itself may store media content items (e.g., Amazon Prime Music). In such instances, the network accessible resources 112 may return a URL/URI for the network location at which the media content for the song "Freebird" to the client device 104.

In other examples, the network accessible resources 112 may not store the desired media content. In such examples, the network accessible resources 112 may access one or more network-accessible content stores 116 (e.g., iHeart, Pandora, Spotify, etc.) and identify a network location at which to allow the client device 104 to acquire the media content. The network accessible resources 112 may provide an indication of the network location (e.g., URL, URI, etc.) to the client device 104 to enable the client device 104 to stream the media content from the network accessible content store, or the network-accessible resources 112 of the remote system 110.

Upon receiving an indication of the network-based location, or address, of the media content (e.g., song "Freebird"), one or more components of a media player of the client device 104 may cause a media player instance 118 to open, initialize, prepare, and begin playing the media content determined by the network-accessible resources 112. For example, the media player on the client device 104 may initially call or execute an open function which causes a media player instance 118, or object, to be created (e.g., opened, generated, etc.). The newly opened media player instance 118 may be opened into an "idle" state 120. The components of the media player may then call or execute an initialization function which initializes 122 the media player instance 118 and transfers the media player instance 118 from the idle state to an "initialized" state 124. In some examples, the initialization function may include an indication of the network based location or address of the media content item of the media player instance 118. Further, the components of the media player may call or execute one or more preparing functions which prepares 126 the media player instance 118 and transfers the media player instance 118 from the initialized state 124 into the "prepared" state 128. Once the media player instance 118 for the media content item "Freebird" is in the prepared state, the components of the media player may execute a play command to cause the client device 104 to output the audio. For instance, the media player instance 118 may transition from the prepared state 128 to a play state where the client device 104 is outputting the media data (e.g., audio). Play state may correspond to a state where the client device 104 is outputting media data (e.g., audio data, video data, etc.) via various output components (e.g., speakers, displays, etc.).

In some examples, the network accessible resources 112 may further provide supplemental text data to be output as audio by the client device 104. For instance, the network accessible resources 112 may determine that the intent is to output the song "Freebird," and generate textual data to be output as audio which indicates to the user 102 that the client device 104 is "playing 'Freebird.'"

The components of the client device 104 may further be configured to determine (e.g., predict, identify, etc.) the media content for the pool of media player instances 118. In some examples, the components of the client device 104 may determine the media content for the pool of media player instances 118 based on the media content (e.g., media file, media data, etc.) currently being output. For instance, if the media player on the client device is streaming "Freebird" from the network-accessible content store 116 or the network-accessible resources 112 (e.g., Amazon Prime Music, Pandora Music, YouTube, etc.), the components of the client device 104 may identify other media content indicated by the online media content sources 112 and/or 116 as being related, relevant, or otherwise associated with the media content being streamed and output. For instance, the content store 116 may have a list of recommended artists, songs, genres, etc., associated with the song "Freebird," such as other songs produced by Lynyrd Skynyrd, or other classic rock songs. Further, the content sources 112 and/or 116 may have playlists, or other groupings of media content, which is related or associated with the media content being output. In this way, various content sources may provide indications of media content to be included in the pool of media content sources.

Upon identifying the other media content to be included in the pool of media player instances 118, the components of the media player of the client device 104 may instantiate the pool of media player instances 118. In some examples, the components of the client device 104 may execute one or more scripts to call the various functions for steps 120-128 to cause the media player instances 118 to be instantiated, initialized, and prepared. The various functions called may be dependent on the media player and/or another software platform being used. The components may then maintain the pool of prepared media player instances. If the user 102 then requests playback of a media content item associated with one of the media player instances 118, the media player may cause the corresponding media player instance 118 to transition from the prepared state 128 to the playing state and output the audio via the client device 104.

While the techniques described with respect to FIG. 1 are described with respect to using a voice command 108 to determine the user 102 would like to output media content, in other examples, the client device 104 may use any other type of input component (e.g., mouse, keyboard, gesture, touch interface, etc.) Further, while the speech processing is indicated as being performed at the remote system 110, in various examples, some or all of the speech processing components may be stored locally at the client device 104. Additionally, while the locations of the media content items for the media player instances 118 are described as being network based locations or addressed, in some examples, the media content items may be stored at local physical addresses of the client device 104.

Figure 2:
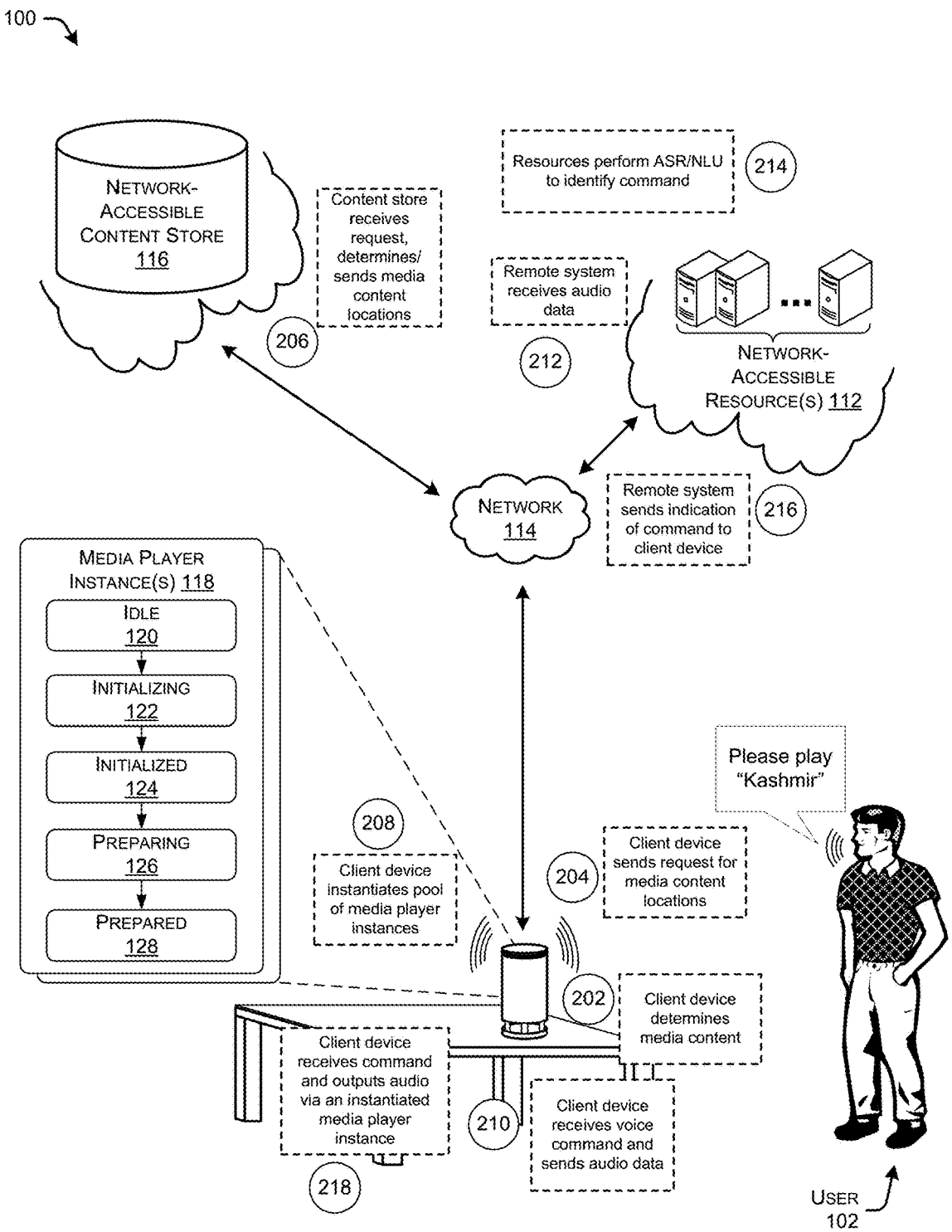
FIG. 2 illustrates another schematic diagram of an illustrative system architecture illustrating steps in which a client device instantiates and prepares multiple instances of a media player prior to receiving a command to play content associated with one of the instances, and causes one of the prepared instances of the media player to play content upon receiving a play command.

FIG. 2 illustrates another schematic diagram of the illustrative system architecture 100 illustrating steps in which a client device 104 instantiates and prepares multiple media player instances 118 of a media player prior to receiving a command to play content associated with one of the instances 118, and causes one of the prepared instances 118 of the media player to play content upon receiving a play command. The system architecture 100 describes an example flow as a sequence of steps. In some examples, the techniques described in FIG. 2 may be in reference to those described in FIG. 1.

At 202, the client device 104 may determine media content to be included in the media player instances 118. For instance, with reference to FIG. 1, the client device 104 may be outputting a media content item corresponding to the song "Freebird" by Lynyrd Skynyrd, and components of the media player of the client device 104 may determine (e.g., predict, identify, etc.) the media content for the pool of media player instances 118. For instance, if the media player on the client device is streaming "Freebird" from the network-accessible content store 116 or the network-accessible resources 112, the components of the client device 104 may identify other media content indicated by the online media content sources 112 and/or 116 as being related, relevant, or otherwise associated with the media content being streamed and output. For instance, the content store 116 may have a list of recommended artists, songs, genres, etc., associated with the song "Freebird," such as other songs produced by Lynyrd Skynyrd, or other classic rock songs. Further, the content sources 112/116 may have playlists, or other groupings of media content, which is related or associated with the media content being output. In this way, various content sources may provide indications of media content to be included in the pool of media content sources.

At 204, the client device 104 may send a request for media content locations for the media content items determined for the pool of media player instances 118. In some examples, the request may be sent to the network-accessible content store 116. At 206, the network-accessible content store 116 may receive the request and determine the media content locations, and send indications of the media content locations back to the client device 104. In some examples, the media content locations may comprise network-based addresses, such as URLs and URIs.

At 208, the client device 108 may receive the indications of the media content locations, and instantiate the pool of media player instances 118. For instance, the components of the media player may execute or call one or more functions to cause the media player instances 118 to open, initialize, and prepare to output each of the media content items. Thus, the client device 104 may open and maintain a pool of media player instances 118 corresponding to media content items that are determined as likely to be played after the song "Freebird" that is currently being output by the client device 104.

At 210, the client device 104 may receive a voice command from the user 102. As illustrated, the voice command is a request to "please play 'Kashmir.'" The client device 104 may generate, using one or more microphones, audio data corresponding to, or representing, the voice command. The client device 104 may then send the audio data at 210 to the remote system 110. At 212, the remote system 110 may receive the audio data from the client device 110.

At 214, the network-accessible resources 112 may perform ASR on the audio data to generate textual data representing the voice command "please play 'Kashmir,'" and further perform NLU on the textual data to determine an intent of the user 102 to have the client device 102 output the song "Kashmir" by Led Zeppelin. In some examples, as described further with reference to FIG. 4, the resources 112 may include domain speechlets which are specialized to determine, based on the intent, commands, and other data for responding to a command in the voice command issued by the user 102.

At 216, the remote system 110 may send an indication of the command to play the song "Kashmir" by Led Zeppelin to the client device 104. In some examples, the remote system 110 may further provide an indication of a network-based location or address at which the media content item (e.g., song) "Kashmir" is located or stored. At 218, the client device 104 may receive the command from the remote system 110 and output audio via an instantiated, and prepared, media player instance 118. For example, the components of the media player may have previously determined that "Kashmir" is likely to be requested by the user 102 based on the fact that "Kashmir" and "Freebird" are both popular classic rock songs. In some examples, the components of the media player may determine, based on a history of interactions by the user 102 with the client device 104, that the user 102 historically requests that the client device play "Freebird" and "Kashmir" more than a threshold percentage of the time (e.g., 10%, 20%, etc.) and within a threshold period of time (e.g., 10 minutes, 20 minutes, etc.). Once the song "Freebird" has completed playing, or has been stopped, the media player may release the media player instance 118 for "Freebird" to make room in the pool of media player instances 118 for additional media content items.

Thus, as illustrated in FIG. 2, rather than having to instantiate, initialize, and prepare a media player instance 118 responsive to receiving the command indication from the remote system 110, the media player on the client device 102 may already have a prepared instance in the pool of media player instances 118 that can be transitioned from the prepared state to the playing state. In this way, playback latency for outputting media content items may be reduced.

Example Client Device

Figure 3:
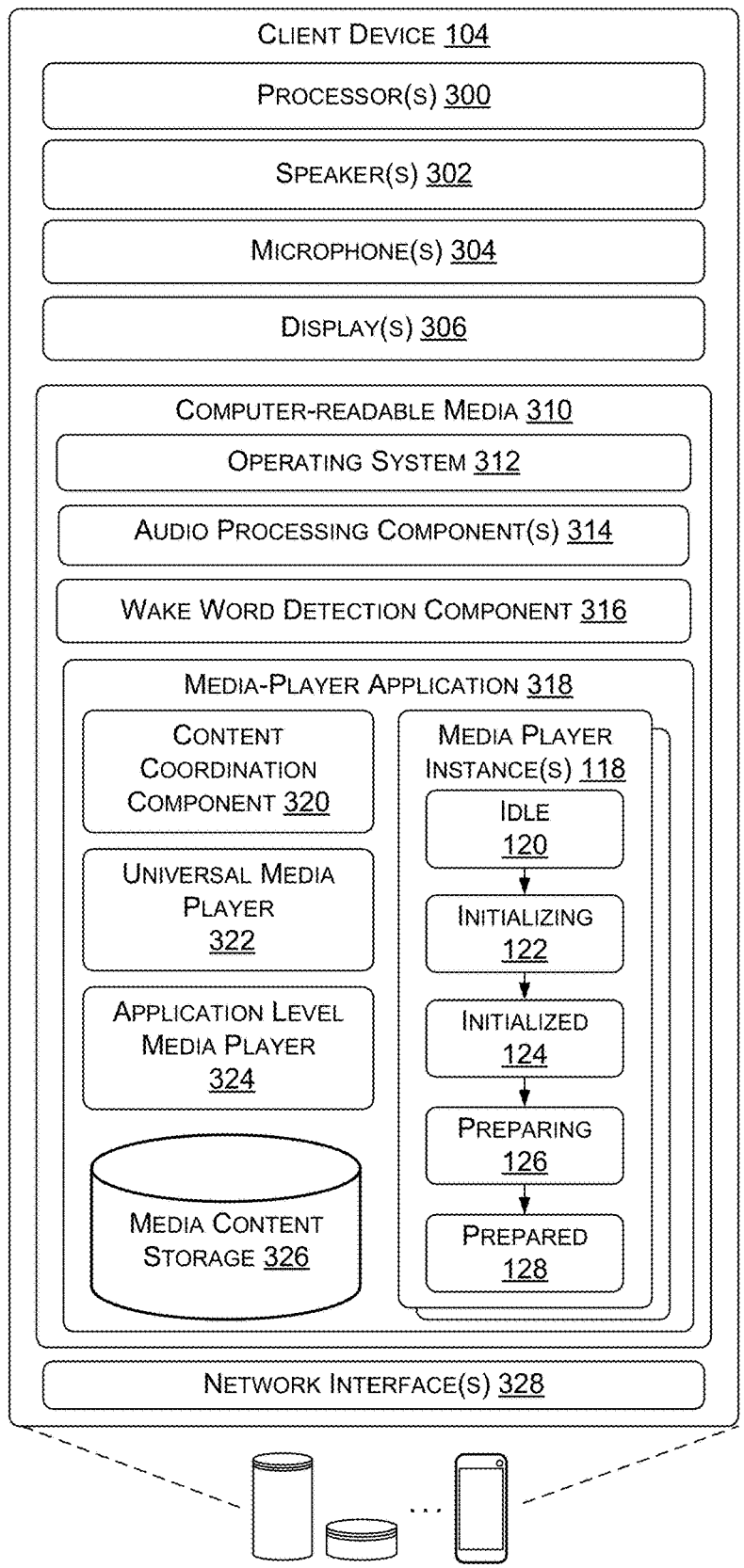
FIG. 3 illustrates a block diagram of an example architecture of a client device that determines media content prior to receiving a request to play the media content, and instantiates multiple instances of a media player corresponding to the determined media content.

FIG. 3 illustrates a block diagram of an example architecture of a client device (e.g., client device 104) that determines media content prior to receiving a request to play the media content, and instantiates multiple media player instances 118 of a media player which correspond to the determined media content.

The client device 104 includes one or more processors 300, one or more speakers 302, and one or more microphones 304. The processors 300 may include a central processing unit (CPU), a graphics processing unit (GPU), a microprocessor, a digital signal processor, and so on. Although not illustrated, the client device 104 may also include one or more input/output devices (e.g., mouse, keyboard, etc.), one or more displays (e.g., touch screen, Liquid-crystal Display (LCD), Light-emitting Diode (LED)

display, organic LED display, plasma display, electronic paper display, etc.), one or more sensors (e.g., accelerometer, magnetometer, etc.), one or more lights, and so on. Any number of components of the client device 104 may be used to receive input from a user and/or to output a response.

Although the client device 104 is illustrated as having one or more integral speakers 302, in other embodiments the client device 104 may not include speakers 302. For example, the client device 104 may comprise a microphone device into which a user speaks to issue commands or may comprise a device for connection to another appliance such as a television. Instead of integrated speakers 302, embodiments such as this may use loudspeaker capabilities of other devices, including other voice-enabled devices that do have loudspeakers and different types of dedicated loudspeaker components. As one example, the client device 104 may produce an audio output signal that drives an external loudspeaker. As another example, the client device 104 may drive or control an external loudspeaker through a wireless data connection such as a Bluetooth connection. In other situations, the client device 104 may be used in conjunction with a loudspeaker device that receives audio signals and other instructions from the remote system 110, rather than from the client device 104.

The microphones 304 may include sensors (e.g., transducers) configured to receive sound. The microphones 304 may generate input signals for audio input (e.g., sound). For example, the microphones 304 may determine digital input signals for a command of a user. In some instances, the microphones 304 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 304 may be in a planar configuration, or positioned apart in a non-planar three-dimensional region. In some implementations, the microphones 204 may include a spatially disparate array of sensors in data communication. For example, a networked array of sensors may be included. The microphones 304 may include omnidirectional microphones, directional microphones (e.g., shotgun microphones), and so on.

In some examples, the microphones 304 and the speakers 302 facilitate interactions, such as dialogue, with user 102. The microphones 304 produce audio signals representing sound from the environment of the client device 104, such voice commands 108 by the user 102. The audio signals produced by the microphones 304 may comprise directional audio signals or may be used to produce directional audio signals, where each of the directional audio signals emphasizes audio from a different radial direction relative to the microphones 304.

The processors 300 of the client device 104 may be coupled to the components of the client device 104 to cause the client device 104 to perform various actions or operations. In some examples, the client device 104 may include one or more displays 306, such as touchscreens, to present media content items (e.g., movies, images, etc.). In some examples, the displays 306 may receive input from the user 102, such as via touch.

The client device 104 may include computer-readable media 310. The computer-readable media 310 may be used to store any number of software components that are executable by the processors 300. Software components stored in the computer-readable media 310 may include an operating system 312 that is configured to manage hardware and services within and coupled to the client device 104. In addition, executable components stored by the computer-readable media 310 may include audio processing components 314 configured to produce an audio signal using the microphones 304. The audio processing components 314 may include functionality for processing microphone audio signals generated by the microphones 304 and/or output audio signals provided to the speakers 302. As an example, the audio processing components 314 may include an acoustic echo cancellation or suppression component for reducing acoustic echo generated by acoustic coupling between the microphones 304 and the speaker 302. The audio processing components 314 may also include a noise reduction component for reducing noise in received audio signals, such as elements of microphone audio signals other than user speech.

The audio processing components 314 may include one or more audio beamformers or beamforming components configured to generate directional audio signals that are focused in different directions. More specifically, the beamforming components may be responsive to audio signals from spatially separated microphone elements of the microphones 304 to produce directional audio signals that emphasize sounds originating from different areas of the environment of the client device 104 or from different directions relative to the client device 104. The beamforming components may in some cases produce audio signal metric values that may be used in arbitration. For example, the beamforming components may indicate a signal strength of voice activity level corresponding to each directional audio signal.

Executable components stored in the computer-readable media 310 and executed by the processors 300 may include a wake word detection component 316 that monitors one or more of the directional audio signals to detect user commands of the system of the trigger expression. As described above, wakeword detection may be implemented using keyword spotting technology, as an example.

The computer-readable media 310 may further include executable components, such as a media player application 318. The media player application may include one or more components, such as a content coordination component 320. While illustrated as being part of the media-player application 318, the content coordination component 320 may be a stand-alone component exterior the media-player application.

The content coordination component 320 may comprise one or more components which are configured to perform various activities described herein. For example, the content coordination component 320 may be configured to determine (e.g., predict, identify, etc.) the media content for the pool of media player instances 118. In some examples, the content coordination component 320 may determine the media content for the pool of media player instances 118 based on media content (e.g., media file, media data, etc.) currently being output by the client device 104. For instance, if the media player application 318 on the client device 104 is streaming music from an online media content source (e.g., Amazon Prime Music, Pandora Music, YouTube, etc.), the content coordination component 320 may identify other media content indicated by the online media content source as being related, relevant, or otherwise associated with the media content being streamed and output. For instance, the online media content source may have a list of recommended artists, songs, genres, etc., associated with the media content being output. Further, the media content source may have playlists, or other groupings of media content, which is related or associated with the media content being output. In this way, various online media content sources may provide indications of media content to be included in the pool of media player instances 118.

In other examples, the content coordination component 320 may identify media content to be included in the pool of media content sources based on user patterns or history. For instance, the content coordination component 320 analyze a history of user behavior to determine that media content being output on a client device 104 is followed by another media content item at more than a threshold rate (e.g., 10% of the time, 20% of the time, etc.). In such examples, the content coordination component 320 may instantiate a media player instance 118 corresponding to the other media content item in anticipation the user 102 will select the content item next. In some examples, the content coordination component 320 may include machine learning algorithms to learn to more accurately predict or determine, based on user behavior, which content items should be included in the pool of media player instances 118. For example, if a user 102 commonly provides a command to the client device 102 to play a group of media content items (e.g., songs) at a particular time of day (e.g., when the user wakes up, when the user gets home from work, etc.), the content coordination component 320 may use the machine learning components to determine that the media player instances should be opened and prepared for those group of media content items at the particular times of the day.

Once the content coordination component 320 determines the media content to be included in the pool of media player instances 118, the content coordination component 320 may further identify various addresses (e.g., identifiers, links, etc.) for the content, such as Universal Resource Locators (URLs) or Uniform Resource Identifiers (URIs) indicating network-based addressed at which the media content is stored, local physical addresses at the client device at which the media content is stored, etc. Further, the content coordination component 320 may determine an indication of a media service/store from which the media content items are streamed.

Using the identifiers or addresses of the media content to be included in the pool of media player instances 118, the content coordination component 320 may instantiate the pool of media player instances 118. In some examples, the content coordination component 320 may execute one or more scripts to call various functions to cause the media player instances 118 to be instantiated. The various functions called may be dependent on the media player and/or another software platform being used.

In some examples, the content coordination component 320 may execute one or more scripts which execute a first function (e.g., "new," "reset( )" etc.) to open and/or reset a media player instance 118. Once the new media player instance 118 is open, the media player instance 118 may enter the idle state 120. The content coordination component 320, or the script executed by the content coordination component 320, may then call or execute a second function (e.g., "setDataSource(FileDescriptor)," "setDataSource(MediaDataSource)," etc.) which begins initializing 122 the media player instance 118 to transition into the initialized sate 124. In some examples, the function to initialize the media player instance 118 may include a field at which to place the source address, or storage location (e.g., URL, URI, local storage location, etc.) of the media content item for the media player instance 118. In some examples, the function which initializes the media player instance 118 may point to a valid media source or item, such as a URL of a location at which the media item is located, and set this media item as the media item that is to be played by the media player instance 118. The media item or source may be a local file on the client device 104, or a streaming media item from the network-accessible content store 116 and/or network accessible resources 112. In some examples where the source address is a local address at the client device 104, the initializing stage 122 may include opening the file for file reading. In some examples when the source address is for a media item stored at a network-accessible location, the initializing stage 122 may include listing various information to set the media item for the media player instance 118. For example, the function may include parameters such as the URI for the media item, the headers to be sent with the request for the data included in the media item, and/or the cookies to be sent together with the request for the data included in the media item. In this way, the media player instance 118 is initialized at 124 by setting or designating a media item for the media player instance 118, including a designation of the source address for the media item.

Once the media player instance 118 is in the initialized state 124, the content coordination component 320, or the one or more scripts, may call or execute one or more functions (e.g., "prepare( )" "prepareAsync( )" etc.) which begin the preparing stage 126 to cause the media player instance 118 to enter the prepared (e.g., ready) state 128. In some examples, the functions included in the preparing stage 126 perform the steps of opening a media item, fetching the media item, buffering the media item, and decoding the media item. Depending on the function called at the preparing stage 126, the media player instance 118 may be prepared for playback synchronously (e.g., "prepare( )") or asynchronously (e.g., "prepareAsync( )"). In some examples, the preparing stage 126 may further include collecting metadata about the media item to be played and/or streamed, such as data about the user interface to be presented along with the media item.

Once the media player instance 118 is in the prepared state 128, the content coordination component 320 may manage or otherwise maintain the media player instance 118 until the instance is either called by the content coordination component 320 to be output by the media player application 318 (e.g., transition into a play state), or the content coordination component 320 closes and releases the media player instance 118.

As described above, the content coordination component 320 may perform these steps for each of the pool of media player instances 118 depending on the number of media content items determined to be instantiated. In this way, the stages of opening, initializing, and preparing need not be performed responsive to a playback command. Instead, the media player instance 118 need only be transitioned from the prepared state 128 to a playing state upon receipt of a playback command for a media content item of the media player instance 118.

In some examples, the content coordination component 320 may receive the command from the media player 318 responsive to user 102 input (e.g., via the touch screen of the display 306, a mouse input, keyboard input, etc.). In various examples, the content coordination component 320 may receive the command, or "directive," to begin playback of the media player instance 118 from the remote system 110 based on a voice command 108.

In various examples, the content coordination component 320 may perform further operations, such as determining a limit or threshold number of media player instances 118 of the media player application 318. The content coordination component 320 may optimize the pool of prepared media player instances 118 based on various factors. For example, a limit or threshold number of prepared media player instances 118 in the pool may be may be a static number (e.g., 1, 5, 10, 15, 50, etc.) that is pre-configured with the media player application 318. In other examples, the content coordination component 320 may dynamically determine the threshold number of prepared media player instances 118 in the pool based on various factors. For example, the content coordination component 320 may analyze user behavior to determine the threshold number of prepared media player instances in the pool. If a particular user requests playback for a significant number of different media content items (e.g., 100, 500, 1,000, etc.) in a particular period of time (e.g., a week, a month, etc.), the components may increase or dynamically set a higher threshold number of prepared media player instances for the pool (e.g., 5, 10, 15, 20, etc.) for that particular user, and vice-versa. The user may have a user account registered with the network accessible resource(s) 112, and the content coordination component 320 may analyze the behavior of the user based on the user account history. For instance, the content coordination component 320 may analyze a history of what media items are selected by the user, how often media items are selected by the user, how many different types of media items are selected by a user over a period of time, etc. In some examples, the content coordination component 320 may determine the user account based on the client device 104 (e.g., IP address of client device), using speaker recognition on the voice command 108, or using another method to identify the user, and the user's associated user account. Based on an analysis of the user account, the content coordination component 320 may dynamically set the threshold number of prepared instances. As another example, certain content items, or content items from certain online media sources, may be used to determine the threshold number of prepared media player instances in the pool. As an example, if an online media source has a small number of recommended media content items for a media content item currently being streamed, the content coordination component 320 may define the threshold number of prepared media player instances in the pool as being roughly the same size (e.g., 2, 5, etc.).

In some examples, the content coordination component 320 may perform further optimizations for outputting media items to a user 102. For example, in instances where a media player instance 118 corresponds to a media item that includes video data to be output on a display 306, the content coordination component 320 may be presented with an initial image corresponding to the media item that has been previously obtained. As an example, one of the media player instances 318 may correspond to a live feed of security camera footage for a camera in a house of a user 104. If a media player instance 118 is initialized and prepared for this live feed, the content coordination component 320 may identify an image, such as a screen shot, of the security camera feed at a previous time. For instance, the content coordination component 320 may save an image or picture from a feed of the security camera at a previous time, and upon receiving a request to output media data corresponding to the particular security camera, the content coordination component may immediately cause the saved picture or image to be output on the display while the live feed of the security camera is output. In this way, it may appear that the security footage is immediately available for viewing, although the actual live feed may take a bit longer to be presented. Once the video data for the live feed is ready to be played, the picture or image may be removed from being presented on the display. In another example, the media player instance 118 may correspond to a music video for a song. In such examples, the content coordination component may have stored an image of a first frame for the music video. In this way, the user may be presented with the first image of the music video while the actual video data is transitioned from the prepared state 128 to the play state (e.g., being output by the speakers 302 and display 306).

The universal media player 322 may generally comprise a component which enables the media player application 318 to output a variety of media content formats (e.g., video formats, audio formats, etc.). For instance, the universal media player 322 may enable the media player application 318 to output video formats such as Audio Video Interleave (AVI), Flash Video Format (FLV), Windows Media Format (WMV), Moving Pictures Expert Group 4 (MP4), or any other type of video formats. Similarly, the universal media player 322 may enable the media player application 318 to output audio formats such as MPEG-1 Audio Layer III (MP3), Waveform Audio File Format (WAV), Windows Media Audio (WMA), etc. The application level media player 324 may enable the media player application 318 to play media content items from various locations local to the client device 104, such as the media content storage 326 which may store various media content items (e.g., audio, video, image, etc.) locally. The application level media player 324 may perform various functionality known in the art.

The client device 104 may further include one or more network interfaces 328 such as a wireless or Wi-Fi network communications interface, an Ethernet communications interface, a cellular network communications interface, a Bluetooth communications interface, etc., for communications by the client device 104 over various types of networks 114, including wide-area network, local-area networks, private networks, public networks etc. In the case of a wireless communications interfaces, such interfaces may include radio transceivers and associated control circuits and logic for implementing appropriate communication protocols.

Example Speech Processing System

Figure 4:
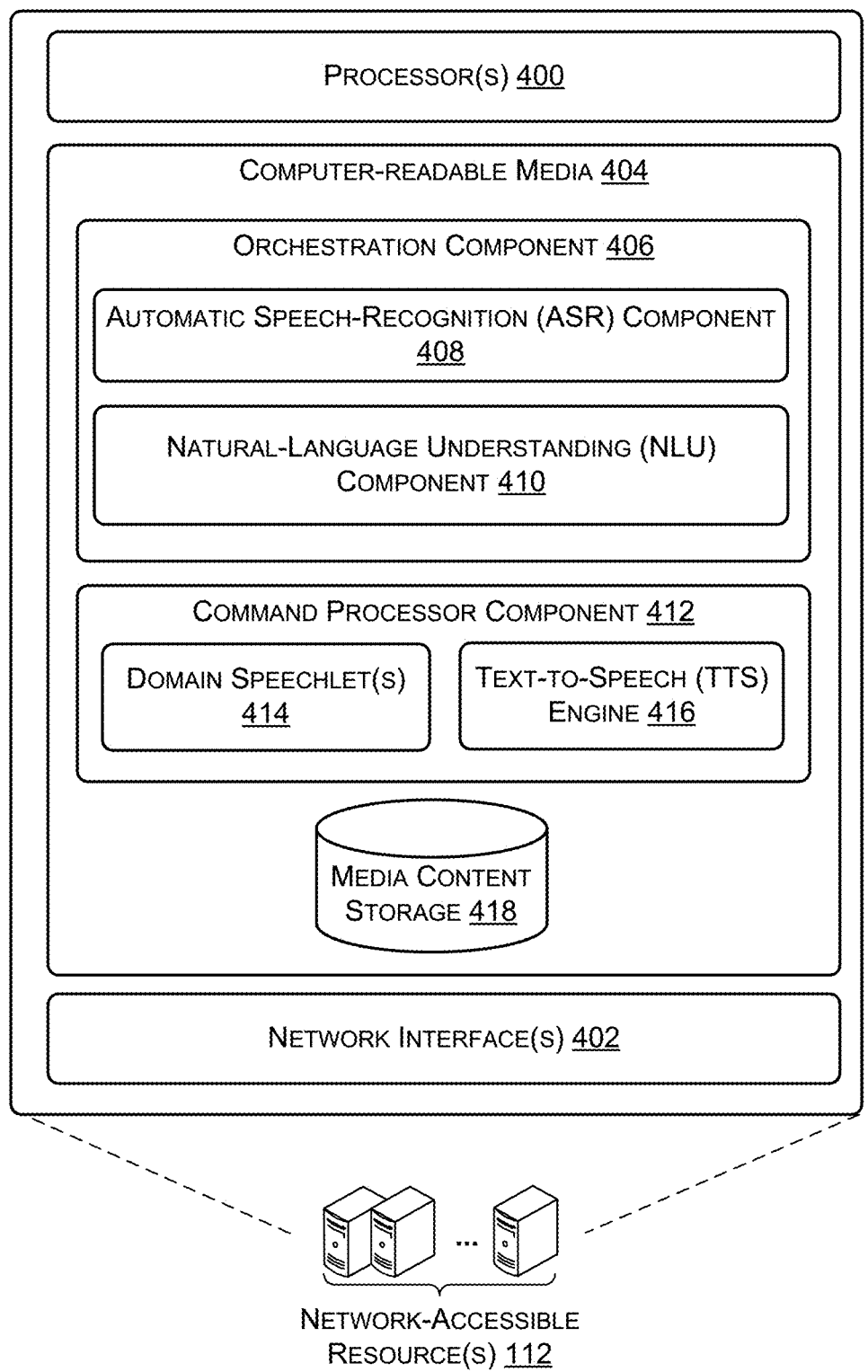
FIG. 4 illustrates a block diagram of an example architecture of network-accessible resources which receives audio signals from client devices which represent voice commands, performs natural language processing on the audio signals to determine a command included in the voice command, and provides the client device with an indication of the command.

FIG. 4 illustrates a block diagram of an example architecture of network-accessible resources (e.g., network-accessible resources 112) which receive audio signals from client devices which represent voice commands, performs natural language processing on the audio signals to determine a command included in the voice command, and provides the client device with an indication of the command.

In various examples, the network-accessible resources 112 may include one or more processors 400 to power components, devices, and actions of the network-accessible resources 112, and one or more network interfaces 402 such as a wireless or Wi-Fi network communications interface, an Ethernet communications interface, a cellular network communications interface, a Bluetooth communications interface, etc., for communications by the network-accessible resources 112 over various types of networks 114, including wide-area network, local-area networks, private networks, public networks etc. In the case of a wireless communications interfaces, such interfaces may include radio transceivers and associated control circuits and logic for implementing appropriate communication protocols.

The network-accessible resources 112 may further include computer-readable media 404 which stores various components, components, or other executable software to perform various arbitration actions to determine which voice-enabled device is to respond to a command in the voice command 108. The computer-readable media may store an operating system 406 that is configured to manage hardware and services within and coupled to the network-accessible resources 112.

The computer-readable media 404 may further store an orchestration component 406 that includes an automatic speech-recognition (ASR) component 408 and a natural-language understanding (NLU) component 410. In some examples, the ASR component 408 may convert audio data received from the client device, which represents the voice command 108, into text. The ASR component 408 transcribes audio data into text data representing the words of the speech contained in the audio data. A voice command 108 in the audio data may be input to a processor configured to perform ASR which then interprets the command based on the similarity between the command and pre-established language models stored in an ASR model knowledge base. For example, the ASR process may compare the input audio data with models for sounds (e.g., subword units or phonemes) and sequences of sounds to identify words that match the sequence of sounds spoken in the command of the audio data.

Generally, NLU component 410 takes textual input (such as the textual input determined by the ASR component 408) and attempts to make a semantic interpretation of the text. That is, the NLU component 410 determines the meaning behind the text based on the individual words and then implements that meaning. NLU component 410 interprets a text string to derive an intent or a desired action from the user as well as the pertinent pieces of information in the text that allow a device (e.g., client device 104) to complete that action. For example, if a voice command is processed using ASR component 408 and outputs the text "play this song" the NLU component 410 may determine that the user 102 intended that the client device be instructed to play the song.

To correctly perform NLU processing of speech input, the NLU component 410 may be configured to determine a "domain" of the command so as to determine and narrow down which services offered by the endpoint device (e.g., the client device 108) may be relevant. For example, the client device 104 may offer services relating to interactions with a telephone service, a contact list service, a calendar/scheduling service, a music player service, a video player service, etc. Words in a single text query may implicate more than one service, and some services may be functionally linked (e.g., both a telephone service and a calendar service may utilize data from the contact list).

The NLU component 410 may begin by identifying potential domains that may relate to the received query. For example, the client device 104 may be associated with domains for music, telephony, calendaring, contact lists, and device-specific communications, but not video. In addition, the device domains may include database entries about specific services on a specific device, either indexed by Device ID, User ID, or Household ID, or some other indicator.

The NLU component 410 parses the textual data to determine an intent or intents for each identified domain, where the intent corresponds to the action to be performed that is responsive to the voice command. Each domain is associated with a database of words linked to intents. For example, a music domain intent database may link words and phrases such as "quiet," "volume off," and "mute" to a "mute" intent. The NLU component 410 identifies potential intents for each identified domain by comparing words in the query to the words and phrases in the domain intents database. In some instances, the determination of an intent by the NLU component 410 is performed using a set of rules or templates that are processed against the incoming text to identify a matching intent.

In some examples, the NLU component 410 may parse the textual data to identify words as subject, object, verb, preposition, etc., based on grammar rules and/or models, prior to recognizing named entities. The identified verb may be used by the NLU component 410 to identify intent. The output data from the NLU component 410 (which may include tagged text, commands, etc.) may then be sent to a command processor 412 component. The destination command processor component 412 may be determined based on the NLU output. For example, if the NLU output includes a command to play a song, the destination command processor 412 may be a music playing application, such as one located on the client device 104, configured to execute a song playing command.

The command processor component 412 may include one or more domain speechlets 414 which determine and generate a response for the client device 104 to perform. In some examples, the command processor component 412 may route identified intents to the appropriate speechlets 414. For example, the speechlets 414 may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. For example, an intent may include a command to play music (play music intent), the command processor component 412 may route the intent to a music domain speechlet 414 configured to execute a music playing command.

Once the command processor component 412 has generated a command, the command processor component 412 may provide the command to the client device 104 to cause the client device 104 to play a song, for example. Further, after the domain speechlet 414 generates the appropriate command based on the intent of the user 102, and/or provides additional content, such as audio data, to be output by one of the client device 104, the domain speechlet 414 may provide this information to a text-to-speech (TTS) engine 416. The TTS engine 416 then generates an actual audio file for outputting the second audio data determined by the domain speechlet 414 (e.g., "playing 'Freebird'"). After generating the file (or "audio data"), the TTS engine 416 may provide this data back to the network-accessible resources 112. While illustrated as being stored at the network-accessible resources 112, in some examples portions of, or all of, the domain speechlets 414 may be stored at the client device 104.

In some examples, the command processor component 412 may determine that the command is to output a media content item. The command processor component 412 may determine whether the network-accessible resources 112 stores the media content item in the media content storage 418. The media content storage 418 may be located across various computing devices or servers of the network-accessible resources 112.

The network-accessible resources 112 may then provide an indication of the command determined by the command processor component 412 (e.g., "play 'Freebird'") to the client device 104, along with other data such as the audio data determined by the TTS engine 416 (e.g., "playing 'Freebird'"), and/or a network location of the media content item that is to be played according to the command (e.g., a media file representing the song "Freebird"). The network-accessible resources 112 may provide some, or all of this data to the client device 104.

As used herein, a processor, such as processor(s) 300 and/or 400, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 300 and/or 400 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 300 and/or 400 may possess its own local memory, which also may store program components, program data, and/or one or more operating systems.

As described herein, computer-readable media 310 and/or 404 may include volatile and nonvolatile memory, removable and non-removable media implemented in any method or technology for storage of information, such as computer-readable instructions, data structures, program component, or other data. Such computer-readable media 310 and/or 404 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 300, and/or 400 to execute instructions stored on the computer-readable media 310 and/or 404. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 310 and/or 404, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Example Processes

Figure 5:
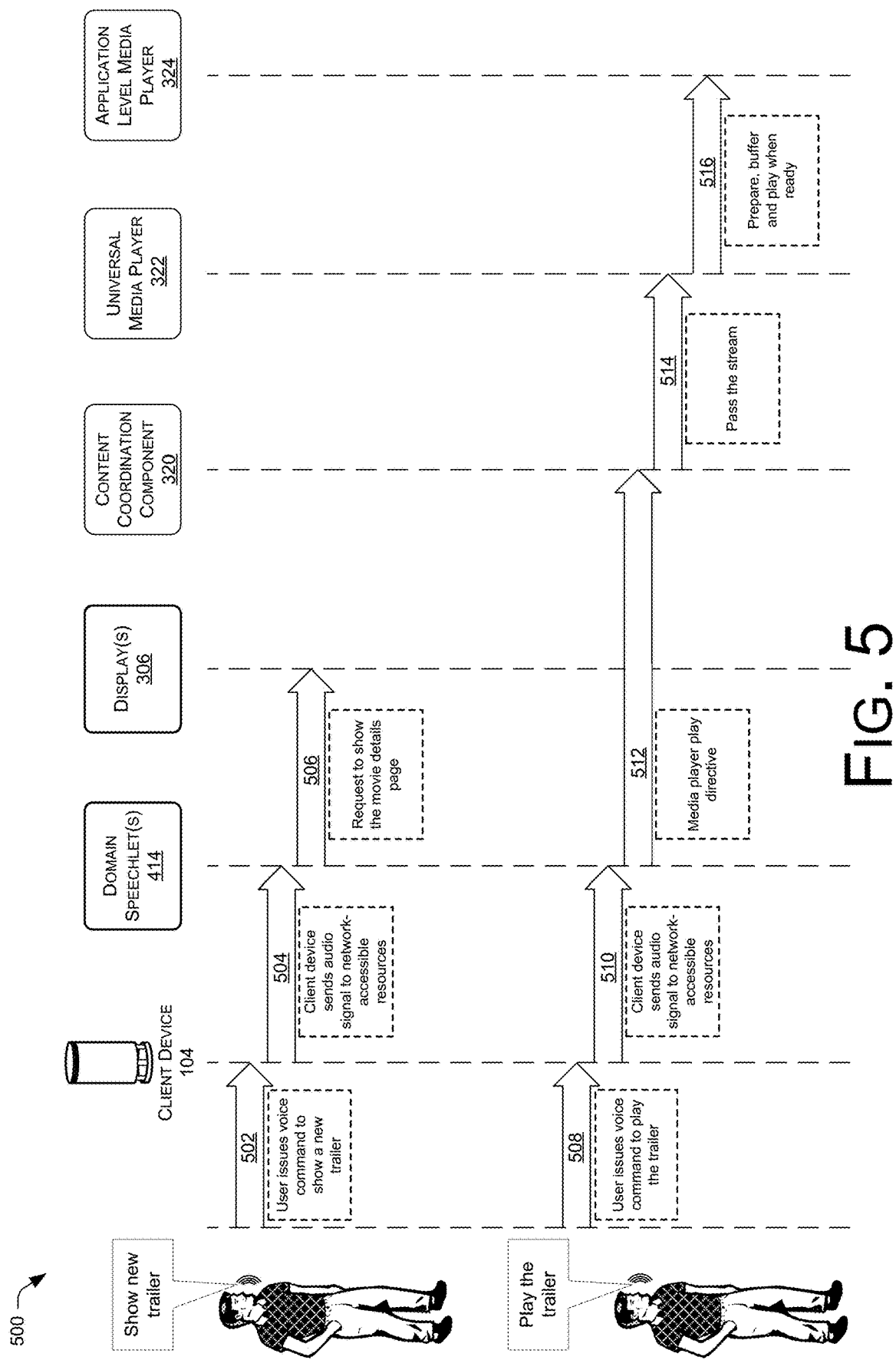
FIG. 5 illustrates a flow diagram of an example process for determining a command in a voice command to play media content, and passing a stream of the media content to a media player responsive to receiving a play directive.

FIG. 5 illustrates a flow diagram of an example process 500 for determining a command in a voice command to play media content, and passing a stream of the media content to a media player responsive to receiving a play directive. In some examples, the process 500 illustrated in FIG. 5 may correspond to techniques in which media player instances 118 are not instantiated to reduce latency.

At 502, the user 102 issues a voice command to show a new trailer. At 504, the client device 104 generates audio data representing the voice command, and sends the audio data (e.g., signal) to network-accessible resources 112. At 506, the domain speechlets 414, in combination with the command processor component 412, determines that the voice command comprises an intent for a request to show the movie details page for the trailer. The network-accessible resources 112 then sends the indication of the intent to the client device 104, which in turn uses the media player application 318 to present the movie details page on the display 306 associated with the client device 104.

At 508, the user 102 issues a subsequent voice command 108 to "play the trailer," and the client device 104 detects the voice command, generates an audio signal representing the voice command, and sends the audio signal to the network-based resources 112. The domain speechlets 414 of the network-based resources 112 then determines the directive (i.e., command) to cause the media player application 318 to play the movie trailer, and sends the directive to the content coordination component 320. Upon receiving the command to play the trailer, along with the indication of the URL or URI, the content coordination component 320 then passes the stream of the trailer to the universal media player 322 at 514.

Finally, at 516 the universal media player 322 instantiates the media player instance 118, and transitions the new instance from idle 120, to initialized 124, to prepared 128, to the play state. Generally, the play state corresponds to outputting the media file (e.g., trailer). Thus, in process 500, the media player instance 118 is only instantiated and prepared for playing upon receiving the request to begin playback of the trailer.

Figure 6:
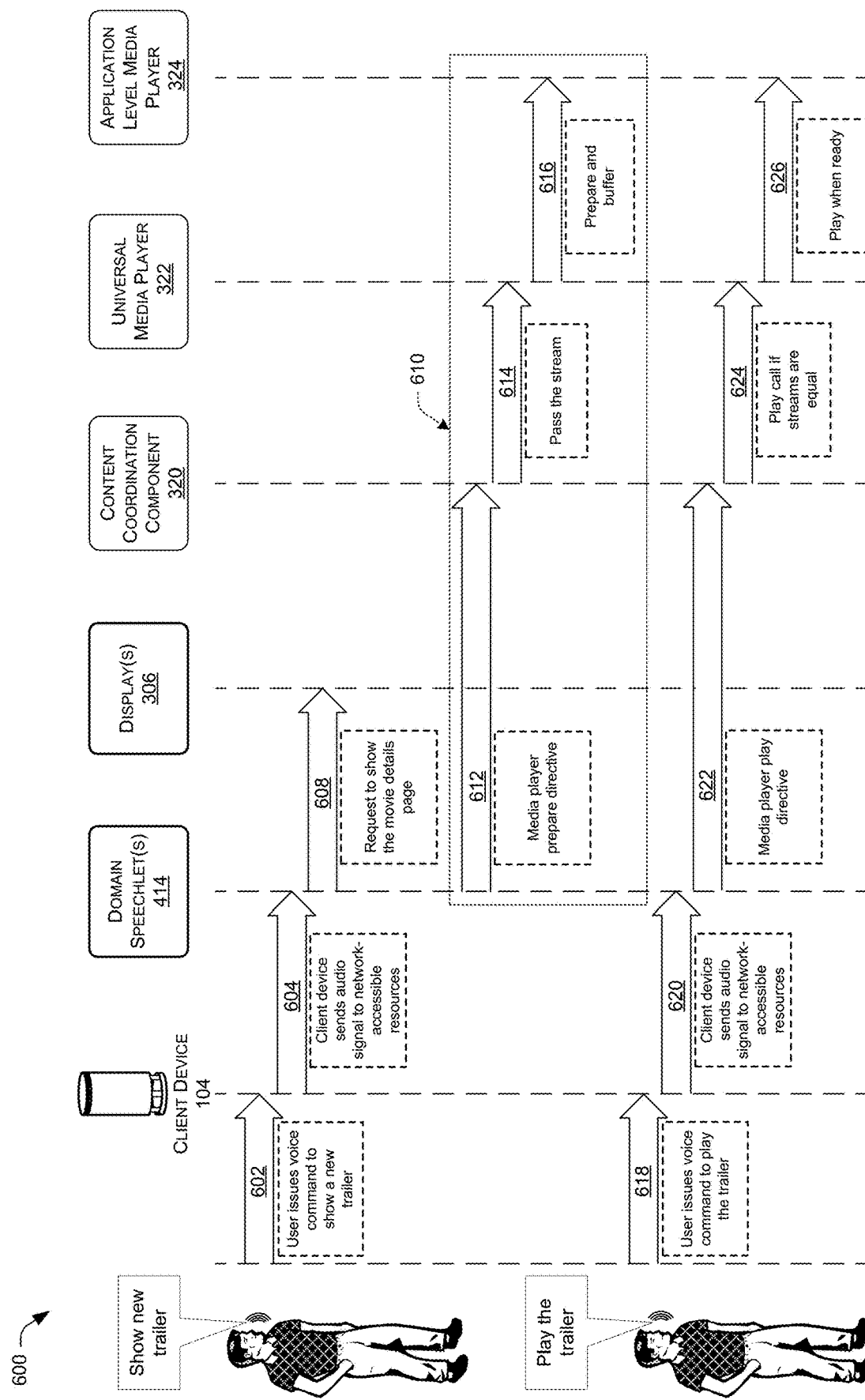
FIG. 6 illustrates another flow diagram of an example process for determining a command in a voice command to play media content, passing a stream of the media content to a media player prior to receiving a play directive, and playing the media content responsive to receiving the play directive.

FIG. 6 illustrates another flow diagram of an example process 600 for determining a command in a voice command to play media content, passing a stream of the media content to a media player prior to receiving a play directive, and playing the media content responsive to receiving the play directive. In some examples, the process 600 illustrated in FIG. 6 may correspond to techniques in which media player instances 118 are instantiated to reduce latency.

At 602, the user 102 issues a voice command to show a new trailer. At 604, the client device 104 generates audio data representing the voice command, and sends the audio data (e.g., signal) to network-accessible resources 112. At 606, the domain speechlets 414, in combination with the command processor component 412, determines that the voice command comprises an intent for a request to show the movie details page for the trailer. The network-accessible resources 112 then sends the indication of the intent to the client device 104, which in turn uses the media player application 318 to present the movie details page on the display 306 associated with the client device 104.

At 610, the content coordination component 320 may perform various operations for reducing latency in playback requests for playing the trailer. In some examples, the content coordination component 320 may identify that the movie details page includes a link (e.g., URL, URI, etc.) to the actual movie trailer. Based on this, the content coordination component 320 may send a request to the network-based resources 112 in order to receive a directive and indication of the URL for the trailer.

At 612, the domain speechlets 414 of the network-based resources 112 then determines the directive (i.e., command) to cause the media player application 318 to prepare a media player instance 118 for the movie trailer, and sends the directive to the content coordination component 320. Upon receiving the directed to prepare the media player instance 118 for the movie trailer, along with the indication of the URL, the content coordination component 320 then passes the stream of the trailer to the universal media player 322 at 614.

At 616, the universal media player 322 instantiates the media player instance 118, and transitions the new instance from idle 120, to initialized 124, to the prepared 128 state. Thus, in process 600, the media player instance 118 is instantiated and prepared for playing prior to receiving the request to begin playback of the trailer.

For instance, at 618, the user 102 issues a subsequent voice command 108 to "play the trailer," and the client device 104 detects the voice command, generates an audio signal representing the voice command, and sends the audio signal to the network-based resources 112 at 620. The domain speechlets 414 of the network-based resources 112 then determines at 622 the directive (i.e., command) to cause the media player application 318 to play the movie trailer, and sends the directive to the content coordination component 320.

Upon receiving the command to play the trailer, along with the indication of the URL, the content coordination component 320 then calls the function to cause the media player instance 118 to transition from the prepared state into the playing state at 624 and 626.

Thus, rather than opening a new media player instance 118, transitioning the media player instance 118 from idle, to initialized, to prepared, all responsive to receiving a play directive, the media player instance 118 is already in the prepared state upon receiving the playback directive. In this way, latency is reduced between the request for playback by the user 102, and the actual playback by the media player application 318.

Figure 7:
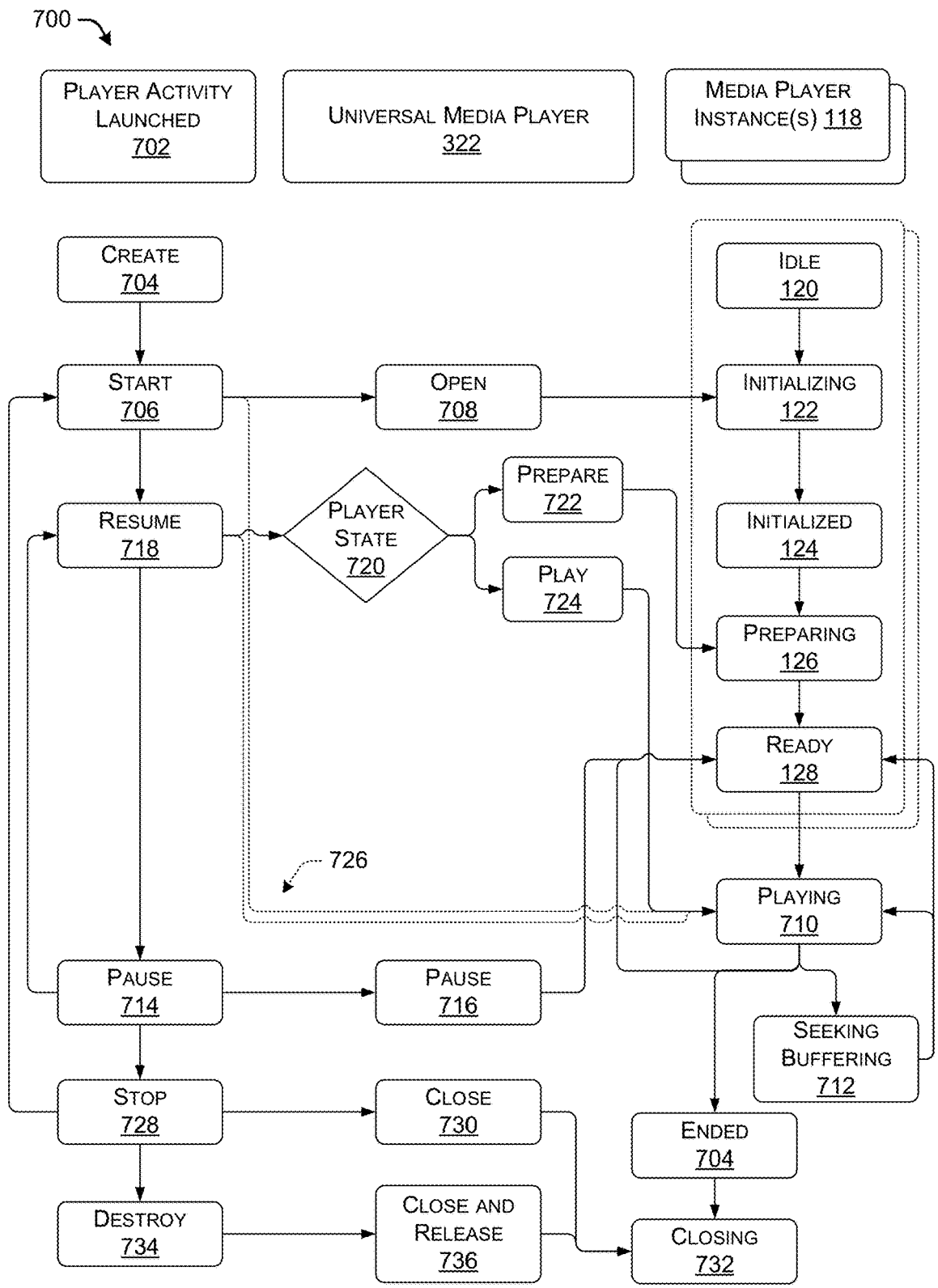
FIG. 7 illustrates a flow diagram of an example process for initializing and preparing multiple media player instances prior to receiving a play directive.

FIG. 7 illustrates a flow diagram of an example process 700 for initializing and preparing multiple media player instances 118 prior to receiving a play directive. FIG. 7 generally depicts a state diagram for a media player application life cycle. Certain portions or states of the diagram will be described with reference to the techniques disclosed herein.

As shown process 700 starts, when the player activity is launched at 702, and the media player application is created 704. Under previous, prior art methods, when the player activity launched 702 is start at 706, the universal media player 322 receives an open command 708 and begins initializing 122 a media player instance 118 in an idle state 120. Thus, upon receiving an open command 708, the media player instance 118 traditionally must move through the states initializing state 122, initialized state 124, preparing state 126, and the ready state 128.

Similarly, using prior art methods, if the player activity is a resume command 718, universal media player 322 determines whether the player state 720 is prepare 722, or play 724, and may move to the preparing state 126 if the player state 720 is prepare 722. Thus, rather than moving to the play state 710, the media player instance 118 may move through preparing 126 and ready 128 prior to playing 710.

Using techniques described herein, the content coordination component 320 may already have instantiated the media player instances 118 and caused them to transition into the ready state at 128 prior to the start 706 and resume 718 player activity launched states. In this way, rather than progressing through the states to get to the ready state 128, the media player instances 118 may transition from the read state 128 directly into the playing state 710 responsive to receiving a playback command.

Figure 8:
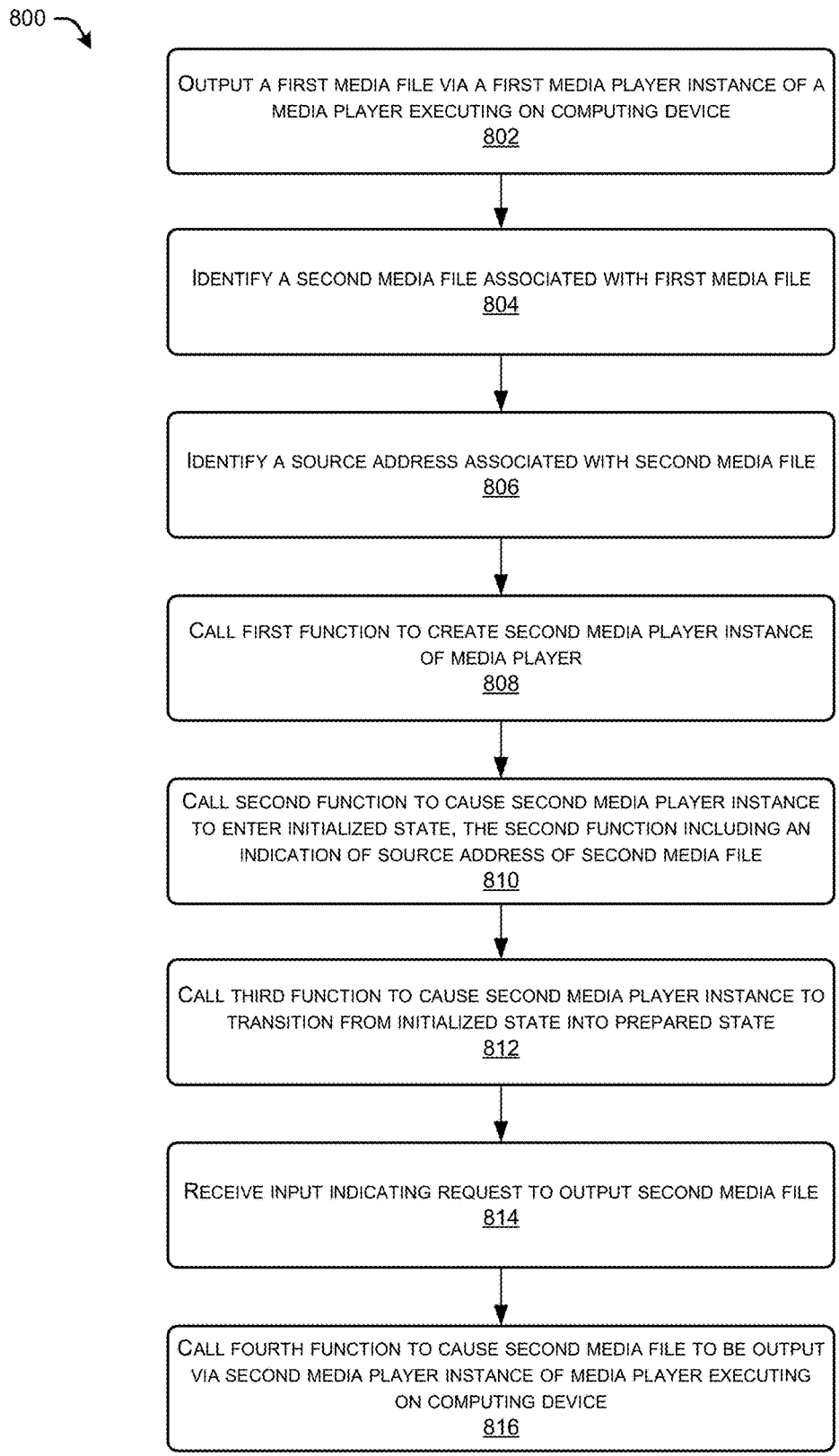
FIG. 8 illustrates a flow diagram of an example process for initializing and preparing a media player instance prior to receiving a request for playback media content associated with the media player instance.

FIG. 8 illustrates a flow diagram of an example process 800 for initializing and preparing a media player instance 118 prior to receiving a request for playback media content associated with the media player instance 118. In some examples, all or some of the steps of process 800 may be performed by the client device 104, or components stored thereon (e.g., media player application 318, content coordination component 320, universal media player 322, application level media player 324, etc.). The order in which the operations or steps are described is not intended to be construed as a limitation, and any number of the described operations may be combined in any order and/or in parallel to implement process 800.

At 802, the client device 104 may output (e.g., via speakers 302, displays 306, etc.), a first media file via a first media player instance 118 of a media player 318 executing on the client device 104.

At 804, the content coordination component 320 may identify a second media file associated with the first media file. In some examples, the content coordination component 320 may identify the second media file by determining that a media service (e.g., network-accessible content store 116, network-accessible resources 112, etc.) from which the first media file is obtained indicates that the second media file is in a same playlist as the first media file. In other examples, the content coordination component 320 may identify the second media file by determining that the media service from which the first media file is obtained indicates that the second media file is recommended to a user based on the first media file being output on the client device. Further, the content coordination component 320 may identify the second media file by determining, based at least in part on historical data indicating user selections of media files, that the second media file is output subsequent to the first media file at a rate that is higher than a threshold rate (e.g., higher than 10% of the time, 20% of the time, etc.).

At 806, prior to receiving input (e.g., touch, speech, etc.) indicating a request to output the second media file, the content coordination component 320 may identify a source address associated with the second media file (e.g., query the network-accessible resources 1112, query the network-accessible content store 116, etc.).

At 808, the content coordination component 320 may call a first function to create a second media player instance 118 of the media player. For instance, the content coordination component 320 may cause the second media player instance 118 to open and move to the idle state 120.

At 810, the content coordination component 320 may call a second function to cause the second media player instance 118 to enter (initializing 122) an initialized state 124, wherein the second function includes an indication of the source address associated with the second media file.

In some examples, the content coordination component 320, or the script executed by the content coordination component 320, may call or execute the second function (e.g., "setDataSource(FileDescriptor)," "setDataSource(MediaDataSource)," etc.) which begins initializing 122 the media player instance 118 to transition into the initialized sate 124. In some examples, the function to initialize the media player instance 118 may include a field at which to place the source address, or storage location (e.g., URL, URI, local storage location, etc.) of the media content item for the media player instance 118. In some examples, the function which initializes the media player instance 118 may point to a valid media source or item, such as a URL of a location at which the media item is located, and set this media item as the media item that is to be played by the media player instance 118. The media item or source may be a local file on the client device 104, or a streaming media item from the network-accessible content store 116 and/or network accessible resources 112. In some examples where the source address is a local address at the client device 104, the initializing stage 122 may include opening the file for file reading. In some examples when the source address is for a media item stored at a network-accessible location, the initializing stage 122 may include listing various information to set the media item for the media player instance 118. For example, the function may include parameters such as the URI for the media item, the headers to be sent with the request for the data included in the media item, and/or the cookies to be sent together with the request for the data included in the media item. In this way, the media player instance 118 is initialized at 124 by setting or designating a media item for the media player instance 118, including a designation of the source address for the media item.

At 812, the content coordination component 320 may call a third function to cause the second media player instance 118 to transition (preparing 126) from the initialized state 124 into a prepared state 128. For instance, the content coordination component 320 may cause the second media player instance 118 to access the second media file in order to transition from the initialized state into the prepared state. In some examples, "access" may comprise various steps. For example, if the second media file is a locally stored file, the content coordination component 320 may perform functions such as opening the media file to be read, decoding the media file, fetching the media file, etc. In examples where the second media file is stored at a network-based computing device, accessing the second media file may include steps such as passing the stream of the second media file, fetching data of the second media file, buffering the data of the second media file locally at the client device 104, and/or decoding the second media file. However, causing the second media player instance 118 to transition from the initialized state into the prepared state may include other types of activities known in the art.

In some examples, the content coordination component 320 may further perform various operations for reducing latency. For instance, once the second media player instance 118 is in the prepared state, the content coordination component 320 may cause the second media player instance 118 to playback at least a portion of the second media file. In some examples, such as when the second media file of the second media player instance 118 is a located at a network-based computing device, the second media player instance 118 of the media player may obtain the portion of the second media file from the network-based computing device, and store (e.g., buffering) the portion of the second media file locally at the computing device. In this way, a portion of the second media file is stored locally, which reduces latency time because the second media player instance 118 does not need to obtain data. In some examples, the content coordination component 320 may cause the second media player instance 118 to being playback in order to obtain the portion of the second media file. However, because the fist media file is being output, the second media player instance 118 may play the second media file without sound (e.g., muted), and without presenting any visual data for the second media file. In this way, the second media player instance 118 may obtain and store at least a portion of the second media file in the background quietly while the first media file is being output.

At 814, the content coordination component 320 may receive input (e.g., voice command, mouse input, keyboard input, etc.) indicating the request to output the second media file. At 816, the content coordination component 320 may call a fourth function to cause the second media file to be output via the second media player instance of the media player executing on the computing device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computing device comprising:
one or more processors; and
computer-readable media storing computer-executable instructions that, when executed by the one or more processors, cause the one or more processors to perform operations comprising:
outputting, by the computing device, a first media file via a first media player instance of a media player executing on the computing device;
identifying a media type of the first media file;
determining a threshold number of media player instances to be included in a group of media player instances based at least in part on the media type of the first media file, each of the group of media player instances being in a prepared state for outputting respective ones of a group of media files;
identifying a second media file relevant to the first media file, wherein a current number of media player instances in the group is less than the threshold number;
prior to receiving a request to output the second media file:
identifying a first source address indicating a location at which the second media file is stored;
creating a second media player instance of the media player;
causing the second media player instance to enter an initialized state by providing an indication of the first source address for the second media player instance to access the second media file; and causing the second media player instance to access the second media file to transition from the initialized state into the prepared state, wherein the second media player instance is included in the group of media player instances;

receiving the request to output the second media file; and causing the second media player instance to transition from the prepared state to a play state in which the second media file is output via the second media player instance.

2. The computing device of claim 1, the operations further comprising:

determining a group of media files relevant to the first media file;

creating a media player instance for each of the group of media files resulting in the group of media player instances;

causing the group of media player instances to transition into the prepared state; and responsive to receiving the request to output the second media file, selecting the second media player instance from amongst the group of media player instances to output the second media file.

3. The computing device of claim 1, wherein the second media file is stored at a network-based computing device, and the operations further comprising, prior to receiving the request to output the second media file:

causing the second media player instance to playback a first portion of the second media file such that the second media player instance of the media player (i) obtains the first portion of the second media file from the network-based computing device, and (ii) stores the first portion of the second media file at the computing device, wherein the second media player instance of the media player plays back the first portion of the second media file without the computing device outputting audio data or video data of the second media file.

4. The computing device of claim 1, wherein the second media file includes video data, the operations further comprising:

identifying an image, captured at a prior time, and representing the video data of the second media file at the prior time;

responsive to receiving the request to output the second media file, causing the image to be presented on a display associated with the computing device; and removing the image from being presented on the display in response to the second media player instance of the media player outputting the video data of the second media file on the display.

5. A method comprising:

identifying, by a computing device, a first source address indicating a location at which first media data is stored;

prior to receiving a request to output the first media data:

creating a first media player instance of the media player stored on the computing device; and causing the first media player instance to transition into a prepared state by (i) providing an indication of the first source address to the first media player instance and (ii) causing the first media player instance to access the first media data;

receiving the request to output the first media data;

causing the first media player instance to transition from the prepared state into a play state in which the first media data is output by the computing device;

determining a threshold number of media player instances permitted to be in the prepared state based at least in part on a previous number of media player instances played in a predetermined period of time by a user account associated with the computing device;

identifying a group of media data relevant to the first media data based at least in part on a characteristic of the first media data; and causing a group of media player instances to be in the prepared state, wherein the group of media player instances is less than the threshold number of media player instances.

6. The method of claim 5, wherein causing the first media player instance to transition into the prepared state comprises:

calling a first function to cause the first media player instance to transition from an idle state into an initialized state, wherein the first function provides the indication of the first source address to the first media player instance; and calling a second function to cause the first media player instance to transition from the initialized state to the prepared state by causing the first media player instance to access the first media data.

7. The method of claim 5, further comprising creating the group of media player instances that are in the prepared state, the creating comprising:

creating a media player instance for each of the group of media data; and causing the group of media player instances to transition into the prepared state.

8. The method of claim 5, further comprising:

identifying the user account associated with the computing device; and analyzing a history of media data selections associated with the user account; and determining the threshold number of media player instances to be included in the group is based at least in part on the history of media data selections.

9. The method of claim 5, further comprising, prior to creating the first media player instance:

outputting, by the computing device, second media data via a second media player instance of the media player executing on the computing device; and identifying the first media data as being associated with the second media data, the identifying comprising at least one of:

determining that a media service from which the second media data is obtained indicates that the second media data is in a same playlist as the first media data;

determining that the media service from which the second media data is obtained indicates that the first media data is recommended to a user based on the second media data being output on the computing device; or determining, based at least in part on historical data indicating user selections of media data, that the first media data is output after the second media data at a rate that is higher than a threshold rate.

10. The method of claim 5, further comprising:

generating, at least in part by a microphone of the computing device, audio data representing an utterance; and sending the audio data to a speech processing system, wherein receiving the input indicating the request to output the first media data comprises receiving, from the speech processing system, a command to output the first media data responsive to the utterance.

11. The method of claim 5, wherein the first media data includes video data, the method further comprising:
identifying an image, captured at a prior time, representing the video data of the first media data;
responsive to receiving the request to output the first media data, causing the image to be presented on a display associated with the computing device; and
removing the image from being presented on the display prior to the first media player instance of the media player outputting the video data of the first media data on the display.

12. The method of claim 5, further comprising, while the first media player instance is outputting the first media data:
identifying second media data relevant to the first media data, the second media data being stored at a network-based computing device;
creating a second media player instance of the media player for the second media data;
causing the second media player instance to transition into the prepared state; and
causing the second media player instance to playback a first portion of the second media data such that the second media player instance of the media player (i) obtains the first portion of the second media data, and (ii) stores the first portion of the second media data at the computing device, wherein the second media player instance plays back the first portion of the second media data without the computing device outputting audio data or video data of the second media data.

13. The method of claim 5, wherein the characteristic of the first media data comprises at least one of:
a provider of the first media data;
the first source address at which the first media data is stored;
a number of media data offered by the provider and associated with the first media data; or
a media data type associated with the first media data.

14. A system comprising:
one or more processors; and
computer-readable media storing computer-executable instructions that, when executed by the one or more processors, cause the one or more processors to perform operations comprising:
prior to receiving a request to output first media data:
identifying a first address indicating a location at which the first media data is stored;
opening a first media player instance of a media player executing on the one or more processors; and
causing the first media player instance to transition to a ready state by providing the first address to the first media player instance and by causing the first media player instance to access the first media data;
receiving the request to output the first media data;
causing the first media player instance to transition from the ready state to a play state in which the first media data is output;
determining a threshold number of media player instances permitted to be in the ready state based at least in part on a previous number of media player instances included in a previous group of media player instances associated with a user account;
identifying a group of media data relevant to the first media data based at least in part on a characteristic of the user account; and
causing a group of media player instances to be in the ready state, wherein the group of media player instances is less than the threshold number of media player instances.

15. The system of claim 14, further comprising:
calling a first function to cause the first media player instance to transition from an idle state into an initialized state, wherein the first function provides the indication of the first address to the first media player instance;
calling a second function to cause the first media player instance to access the first media data to transition from the initialized state to the ready state; and
calling a third function to cause the first media player instance to transition from the ready state to the play state.

16. The system of claim 14, the operations further comprising:
while the first media data is being output:
identifying a second address indicating at location at which second media data is stored, the second media data being relevant to the first media data and included within the group of media player instances;
opening a second media player instance of the media player;
causing the second media instance to transition into the ready state by providing the second address to the second media player instance and by causing the second media player instance to access the second media data;
receiving another request to output the second media data; and
causing the second media player instance to transition from the ready state to the play state in which the second media data is output.

17. The system of claim 16, wherein the second media data includes video data, the operations further comprising:
identifying an image, captured at a prior time, representing the video data of the second media data;
responsive to receiving the other request to output the second media data, causing the image to be presented on a display associated with the system; and
removing the image from being presented on the display in response to the second media player instance outputting the video data of the second media data.

18. The system of claim 14, further comprising creating the group of media player instances that are in the ready state, the creating comprising:
determining the group of media data relevant to the first media data;
opening a media player instance for each of the group of media data; and
causing the group of media player instances to transition into the ready state.

19. The system of claim 14, the operations further comprising:
generating, by a microphone associated with the system, audio data representing a voice utterance; and
sending the audio data to a speech processing system, wherein identifying the first address indicating the location at which the first media data is stored comprises receiving, from the speech processing system, an indication of a network-based location of the first media data.

20. The system of claim 14, wherein the characteristic comprises at least one of:
  a previous number of media player instances played in a predetermined period of time; or
  a type of media player instance previously selected by the user account.

* * * * *